United States Patent
Mayr et al.

(10) Patent No.: US 10,787,060 B1
(45) Date of Patent: Sep. 29, 2020

(54) BODY STRUCTURE VENTILATION

(71) Applicants: Johannes Mayr, Sunnyvale, CA (US); John M. Kearney, San Mateo, CA (US); Reinhard Hoermann, San Jose, CA (US)

(72) Inventors: Johannes Mayr, Sunnyvale, CA (US); John M. Kearney, San Mateo, CA (US); Reinhard Hoermann, San Jose, CA (US)

(73) Assignee: APPLE INC., Cupertino, CA (US)

(*) Notice: Subject to any disclaimer, the term of this patent is extended or adjusted under 35 U.S.C. 154(b) by 244 days.

(21) Appl. No.: 15/709,505

(22) Filed: Sep. 20, 2017

Related U.S. Application Data

(60) Provisional application No. 62/397,374, filed on Sep. 21, 2016.

(51) Int. Cl.
*B60H 1/24* (2006.01)
*B62D 25/04* (2006.01)
*B60H 1/00* (2006.01)

(52) U.S. Cl.
CPC ......... *B60H 1/243* (2013.01); *B60H 1/00564* (2013.01); *B62D 25/04* (2013.01)

(58) Field of Classification Search
CPC ..... B60H 1/243; B60H 1/00564; B62D 25/04
See application file for complete search history.

(56) References Cited

U.S. PATENT DOCUMENTS

| | | | | |
|---|---|---|---|---|
| 2,210,592 A | * | 8/1940 | Lintern | B60H 1/262 454/136 |
| 4,078,840 A | * | 3/1978 | Itoh | B62D 25/081 296/192 |
| 4,522,114 A | * | 6/1985 | Matsuno | B60H 1/0055 454/127 |
| 4,660,462 A | * | 4/1987 | Thompson | B01D 61/08 454/158 |
| 4,721,031 A | * | 1/1988 | Nakata | B62D 33/0617 296/190.09 |
| 5,354,114 A | | 10/1994 | Kelman et al. | |
| 5,399,121 A | * | 3/1995 | Gray | B60H 1/243 454/124 |
| 5,591,078 A | * | 1/1997 | Filion | B29C 44/12 454/124 |
| 5,695,238 A | * | 12/1997 | Calamari | B62D 21/17 280/756 |
| 5,888,600 A | * | 3/1999 | Wycech | B29C 44/12 428/35.9 |
| 5,913,566 A | * | 6/1999 | Stauffer | B60H 1/00378 296/190.1 |

(Continued)

*Primary Examiner* — Avinash A Savani
*Assistant Examiner* — Martha M Becton
(74) *Attorney, Agent, or Firm* — Young Basile Hanlon & MacFarlane, P.C.

(57) ABSTRACT

A vehicle body structure located adjacent to a passenger compartment of a vehicle includes a first wall defining an interior space adjacent to the first wall; a second wall extending outward from the first wall and defining a passageway in communication with the interior space; and a duct having a body that is disposed in the interior space of the first wall and an outlet that extends outward from the body and is disposed in the passageway of the second wall. The duct routes conditioned air from the body through the outlet to the passenger compartment of the vehicle.

20 Claims, 3 Drawing Sheets

(56) References Cited

U.S. PATENT DOCUMENTS

| | | | | |
|---|---|---|---|---|
| 5,921,619 | A * | 7/1999 | Cederberg | B60H 1/00378 |
| | | | | 296/190.09 |
| 5,988,733 | A * | 11/1999 | Kamo | B60R 13/025 |
| | | | | 296/187.05 |
| 6,135,542 | A * | 10/2000 | Emmelmann | B62D 21/09 |
| | | | | 296/187.02 |
| 6,273,495 | B1 * | 8/2001 | Haba | B60H 1/0055 |
| | | | | 296/193.02 |
| 6,315,354 | B1 * | 11/2001 | Tani | B60H 1/00207 |
| | | | | 296/208 |
| 6,318,102 | B1 * | 11/2001 | Asou | B60H 1/00207 |
| | | | | 454/137 |
| 6,322,136 | B2 * | 11/2001 | Boyce | B60H 1/247 |
| | | | | 296/214 |
| 6,409,590 | B1 * | 6/2002 | Suzuki | B60H 1/0055 |
| | | | | 454/143 |
| 6,685,260 | B1 | 2/2004 | Passebecq et al. | |
| 6,688,680 | B1 * | 2/2004 | Cooper | B62D 25/145 |
| | | | | 296/208 |
| 6,929,312 | B2 * | 8/2005 | Rich | B60H 1/0055 |
| | | | | 296/187.02 |
| 7,234,763 | B2 * | 6/2007 | Gupta | B60N 2/3013 |
| | | | | 296/193.02 |
| 7,300,102 | B2 * | 11/2007 | Gupta | B60N 2/3013 |
| | | | | 296/193.02 |
| 8,480,166 | B1 * | 7/2013 | Readwin | B60H 1/00564 |
| | | | | 296/208 |
| 9,365,244 | B2 * | 6/2016 | Appasamy | B62D 25/145 |
| 9,764,769 | B2 * | 9/2017 | Boettcher | B62D 25/04 |
| 10,300,762 | B2 * | 5/2019 | Vorenkamp | B60H 1/00564 |
| 10,399,603 | B2 * | 9/2019 | Boettcher | B62D 29/002 |
| 2005/0082872 | A1 * | 4/2005 | Rich | B60H 1/0055 |
| | | | | 296/187.02 |

* cited by examiner

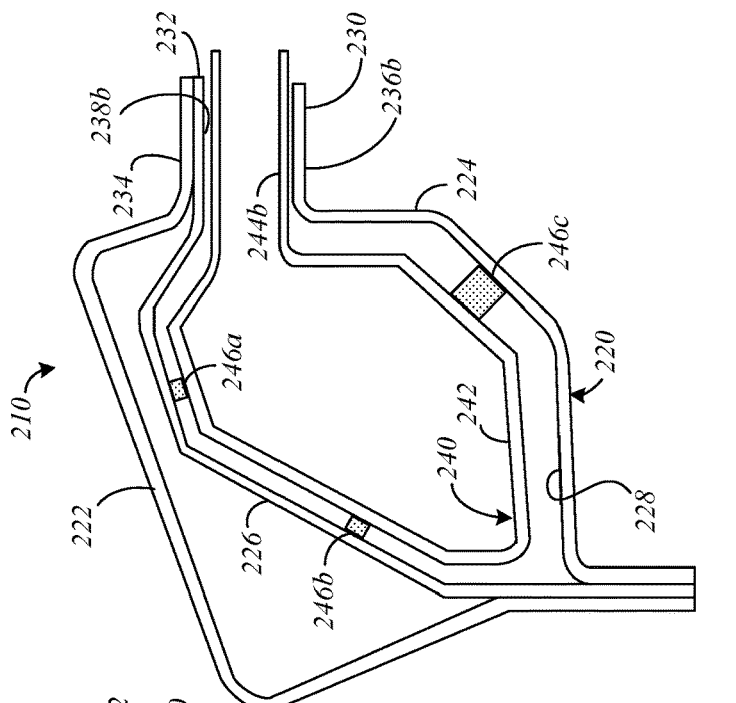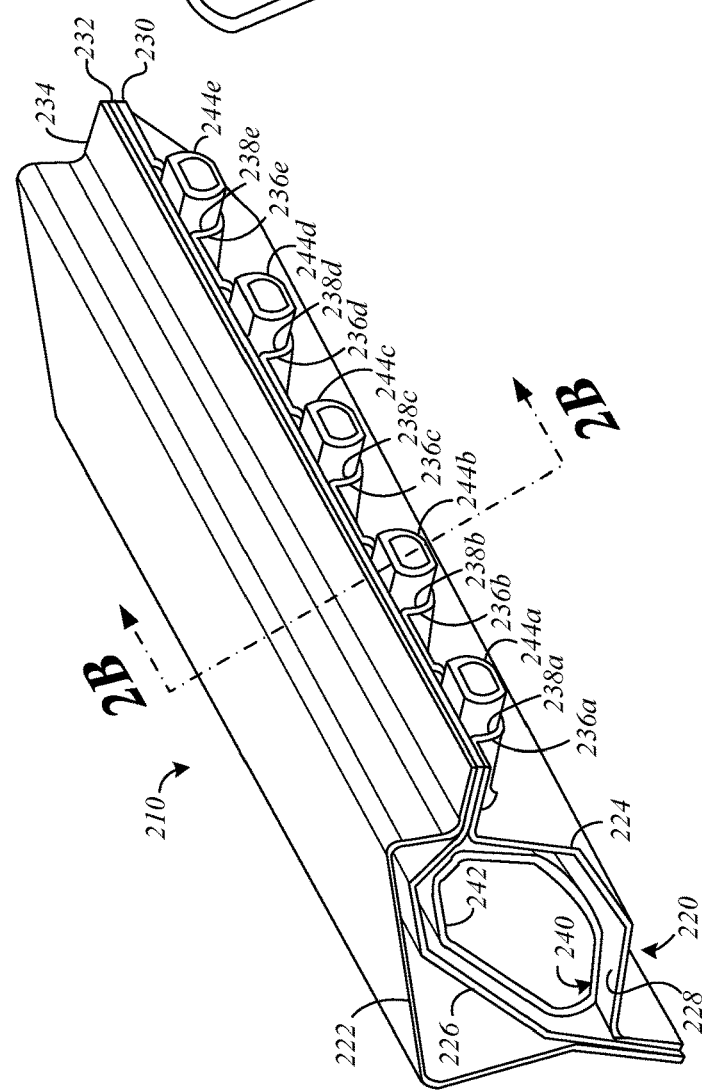

BODY STRUCTURE VENTILATION

CROSS-REFERENCE TO RELATED APPLICATIONS

This application claims priority to U.S. Provisional Application Ser. No. 62/397,374, filed Sep. 21, 2016, entitled "Body Structure Ventilation," the contents of which are incorporated herein by reference.

TECHNICAL FIELD

The disclosure relates generally to the field of vehicle body structures and particularly to body structures forming or housing ventilation ducts.

BACKGROUND

Typical vehicle body structures include structural rails, sills, and pillars that support portions of the vehicle, such as a roof and a door. As an example, most vehicles include structural pillars referred to as "A-pillars" that are positioned adjacent to a windshield and forward of a front door of the vehicle, "B-pillars" that are positioned between the front door and a rear door of the vehicle, and "C-pillars" that are positioned rearward of the rear door of the vehicle. Typical vehicles also include roof rails that extend between upper ends and door sills that extend between lower ends of the A-pillars, B-pillars, and C-pillars. The A-pillars, B-pillars, C-pillars, roof rails, and door sills function to support the roof and the doors of the vehicle and to define openings into the passenger compartment of the vehicle.

The size of each structural rail, sill, and pillar is selected to satisfy certain strength requirements. For example, structural rails are usually designed to provide a certain degree of resistance to deformation during a crash. Interior components, such as roof trim and door trim, are often packaged tightly against body structures, leaving limited space between the body structures and the trim components for routing of other system components, such as ventilation ducts.

SUMMARY

One aspect of the disclosure is vehicle body structure located adjacent to a passenger compartment of the vehicle. The structure includes a first wall defining an interior space adjacent to the first wall; a second wall extending outward from the first wall and defining a passageway in communication with the interior space; and a duct having a body that is disposed in the interior space of the first wall and an outlet that extends outward from the body and is disposed in the passageway of the second wall. The duct routes conditioned air from the body through the outlet to the passenger compartment of the vehicle.

Another aspect of the disclosure is a vehicle body structure located adjacent to a passenger compartment of the vehicle. The structure includes a first panel extending to a first flanged portion and a second panel extending to a second flanged portion. The first flanged portion and the second flanged portion are coupled to form an interior space between the first panel and the second panel. The second flanged portion has an indentation that forms a passageway between the first flanged portion and the second flanged portion, and the passageway is in communication with the interior space. The structure also includes a duct having a body disposed in the interior space between the first panel and the second panel and an outlet that extends outward from the body and is disposed in the passageway. The duct routes conditioned air from the body through the outlet to the passenger compartment of the vehicle.

Another aspect of the disclosure is vehicle body structure located adjacent to a passenger compartment of the vehicle. The structure includes a first panel extending to a first flanged portion and a second panel extending to a second flanged portion. The first flanged portion and the second flanged portion are coupled to form an interior space between the first panel and the second panel. The second flanged portion has an indentation that forms a passageway between the first flanged portion and the second flanged portion, and the passageway in communication with the interior space. The structure also includes a coating deposited within the interior space and the passageway. Heat treatment of the coating forms a duct having a body extending along the interior space and an outlet that extends from the body through the passageway. The duct routes conditioned air from the body through the outlet to the passenger compartment of the vehicle.

BRIEF DESCRIPTION OF THE DRAWINGS

FIG. 2A is a partial perspective illustration showing a right-side roof rail of the vehicle body of FIG. 1.

FIG. 2B is a sectional view through FIG. 2A.

DETAILED DESCRIPTION

Vehicle body structures and passenger safety system components such as airbags, inflators, electronics, etc. are spaced from passengers within a passenger compartment and tightly packaged behind trim components. Given the tight packaging, routing ventilation ducts between the body structures and the trim components can be difficult. This disclosure describes various methods of disposing ventilation ducts within various vehicle body structures to save packaging space while controlling the position of the ventilation ducts and providing outlets from the ventilation ducts without weakening the vehicle body structures. Thermal treatment is leveraged in examples where a ventilation duct is formed of a different material than the vehicle body structure in which it is disposed.

Figure 1:
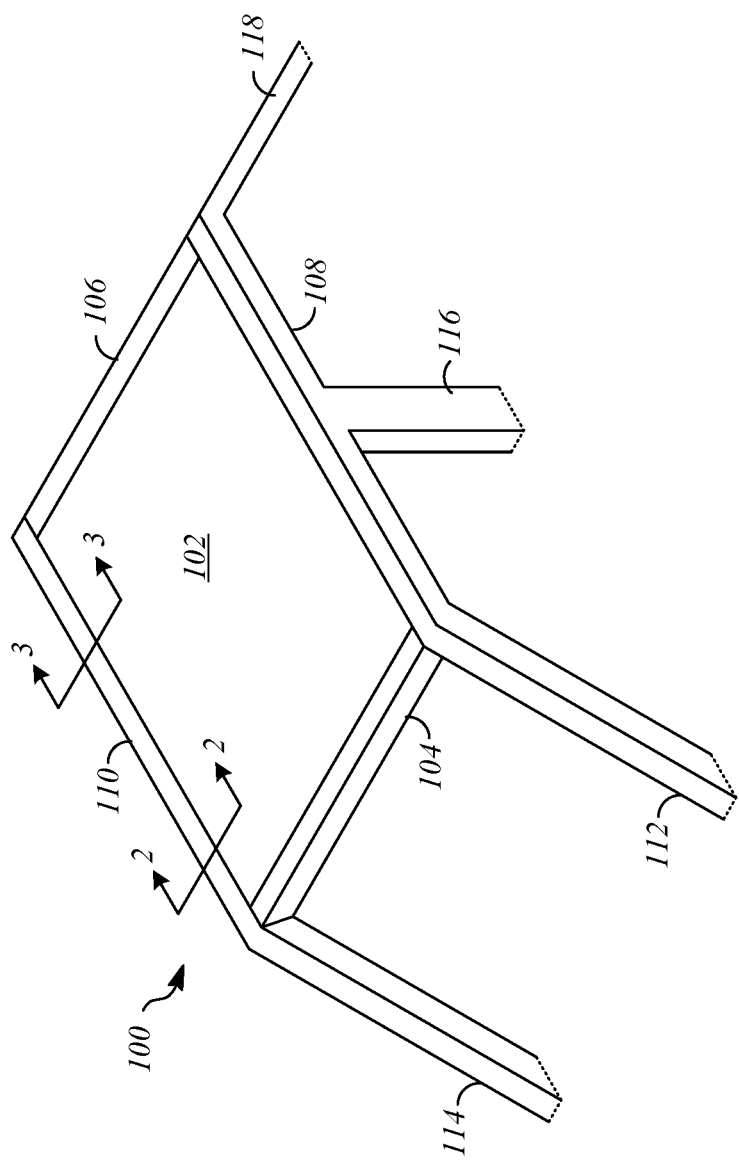
FIG. 1 is a perspective view illustration showing a portion of a vehicle body.

FIG. 1 shows a portion of a vehicle body 100 that includes a roof panel 102 that is supported by vehicle body structures including structural rails and structural pillars. In the illustrated example, the roof panel 102 is bordered by a front header 104 positioned at a front end of the roof panel 102, a rear header 106 positioned at a rear end of the roof panel 102, a left-side cant or roof rail 108 positioned at a left side of the roof panel 102, and a right-side cant or roof rail 110 positioned at a right side of the roof panel 102.

The vehicle body 100 can include a left-side a-pillar 112, a right-side a-pillar 114, a left-side b-pillar 116, a right side b-pillar (not shown), a left-side c-pillar 118, and a right side c-pillar (not shown). The left-side a-pillar 112 can be connected to the front header 104 and to the left-side roof rail 108. The right-side a-pillar 114 can be connected to the front header 104 and to the right-side roof rail 110. The left-side b-pillar 116 can be connected to the left-side roof rail 108, and the right-side b-pillar can be connected to the right-side roof rail 110. The left-side c-pillar 118 can be connected to the rear header 106 and to the left-side roof rail 108. The right-side c-pillar can be connected to the rear header 106 and to the right-side roof rail 110. Each of the front header 104, the rear header 106, the left-side roof rail 108, the right-side roof rail 110, the left-side a-pillar 112, the right-side a-pillar 114, the left-side b-pillar 116, the right side b-pillar, the left-side c-pillar 118, and the right side c-pillar can border one or more window or door openings that are defined by the vehicle body 100.

FIG. 2A is a partial perspective illustration showing a portion of a right-side roof rail 210 of the vehicle body 100 of FIG. 1. FIG. 2B is a sectional view through FIG. 2A. The right-side roof rail 210 includes a rail body 220 formed of an exterior panel 222, a lower panel 224, and an upper panel 226.

In some implementations, the exterior panel 222 is a structural portion of the vehicle body 100. In other implementations, the exterior panel 222 is non-structural, for example, cladding used in conjunction the lower panel 224 and the upper panel 226 to create an A-surface of the vehicle. In other implementations, the exterior panel 222 is omitted. Some parts of the exterior panel 222 may be visible when the vehicle is fully assembled, for example, the exterior panel 222 can be part of a continuous surface that also defines the roof panel 102 as shown in FIG. 1. In the illustrated example, the exterior panel 222 has a generally c-shaped cross-sectional shape that surrounds and substantially encloses the upper panel 226 of the rail body 220.

Together, the lower panel 224 and the upper panel 226 form a vehicle body structure that contributes to the ability of the vehicle body 100 to absorb energy during an impact through controlled deformation while limiting intrusion of other vehicle body structures into the passenger compartment of the vehicle. An interior space 228 is defined between the lower panel 224 and the upper panel 226. The lower panel 224, the upper panel 226, and the interior space 228 form a hollow, elongate beam having a consistent cross-section along its length from a first end to a second end opposite the first end. The elongate beam may be straight or curved (not shown) to follow a curved contour, for example, of the roof panel 102.

The lower panel 224 extends to a first flanged portion 230 and the upper panel 226 extends to a second flanged portion 232, the first and second flanged portions 230, 232 serving as a mating surface for the lower panel 224 and the upper panel 226. For example, the lower panel 224 and the upper panel 226 can be coupled along the first flanged portion 230 and the second flanged portion 232 using welds, rivets, nails, bolts, friction joints, adhesive, or any other suitable joining mechanism. In the example of FIGS. 2A and 2B, the exterior panel 222 also extends to a third flanged portion 234, with the third flanged portion 234 of the exterior panel 222 being coupled to the second flanged portion 232 of the upper panel 226 to complete the rail body 220. In an example where the exterior panel 222, the lower panel 224, and the upper panel 226 are coupled along the first, second, and third flanged portions 230, 232, 234 using welds, the exterior panel 222, the lower panel 224, and the upper panel 226 can be fabricated from sheet metal, such as steel, aluminum, magnesium, or titanium, can be fabricated from plastics or other composites, or can be fabricated of other suitable vehicle body materials.

The first flanged portion 230 of the lower panel 224 includes indentations 236a-e, that is, depressions or corrugations, having a semi-circular cross-sectional shape. When the first flanged portion 230 is coupled to the second flanged portion 232, the indentations 236a-e form passageways 238a-e in communication with the interior space 228 between the lower panel 224 and the upper panel 226. The passageway 238b is shown in FIG. 2B as extending between the first flanged portion 230 and the second flanged portion 232. The passageway 238b is more easily visible in the sectional view of FIG. 2B since the section is taken at the location of the indentation 236b as shown in FIG. 2A.

Though shown in FIGS. 2A and 2B as generally semi-circular, the indentations 236a-e can have round, triangular, square, parabolic, ellipsoid, trapezoidal, free-form, or other shaped cross sections. Further, though shown as present only in the first flanged portion 230 of the lower panel 224, the indentations 236a-e can also be present in the second flanged portion 232 of the upper panel 226, that is, both of the first and second flanged portions 230, 232 can include aligned, opposing indentations (not shown) to form the various passageways 238a-e. When at least one of the first and second flanged portions 230, 232 includes indentations such as the indentations 236a-e, the lower panel 224 and the upper panel 226 can be riveted, nailed, bolted, welded, friction-joined, or glued together between the indentations 236a-e so as to avoid weakening the rail body 220.

As best shown in FIG. 2B, the passageway 238b is in fluid communication with the interior space 228. In other words, air, a type of fluid, can travel from the interior space 228 to the passageway 238b. This hollow portion of the rail body 220 can be used to house a duct 240 used to route conditioned air to the passenger compartment of the vehicle (not shown). The duct 240 includes two portions: a body 242 disposed in the interior space 228 and outlets 244a-e that extend outward from the body 242 and are disposed in the passageways 238a-e. In other words, each of the outlets 244a-e extends through one of the passageways 238a-e formed by the indentations 236a-e. The duct 240 can be formed of a non-metallic material, that is, one suitable both to provide a sealed flow path for ventilation purposes and to withstand high temperature treatment of the rail body 220. For example, the duct 240 can be foam, extruded plastic, or any other material suitable for disposition within the rail body 220, for example, during a manufacturing process.

As shown in FIG. 2B, one or more spacers 246a-c, for example, of acoustic foam, thermal plastic, or other thermally or heat-based expandable material, can be disposed between the duct 240 and the lower panel 224 and the upper panel 226 during the manufacturing process in order to fix the position of the duct 240 within the rail body 220 and to avoid, for example, buzz-squeak-rattle (BSR) and noise-vibration-harness (NVH) concerns. The pads or spacers 246a-c can be designed to expand under thermal load during manufacturing and to create an air gap between the duct 240 and the rail body 220 in order to thermally isolate the duct 240 from the surrounding rail body 220. Isolating the duct 240 from the rail body 220 allows for better control of a temperature of the conditioned air within the duct 240.

Each of the outlets 244a-e can communicate directly or indirectly with the passenger compartment. The outlets 244a-e can be covered with fabric, direct air into a plenum, or pass conditioned air directly into the passenger compartment through an interface, for example, including vanes or directional vents. By routing the duct 240 within the rail body 220, packaging space in an interior of the vehicle is preserved and conditioned air can be directed to novel locations within the passenger compartment. The left-side roof rail (not shown) of the vehicle body 100 can have a structural configuration that is similar to that of the above-described right-side roof rail 210.

Figure 3B:
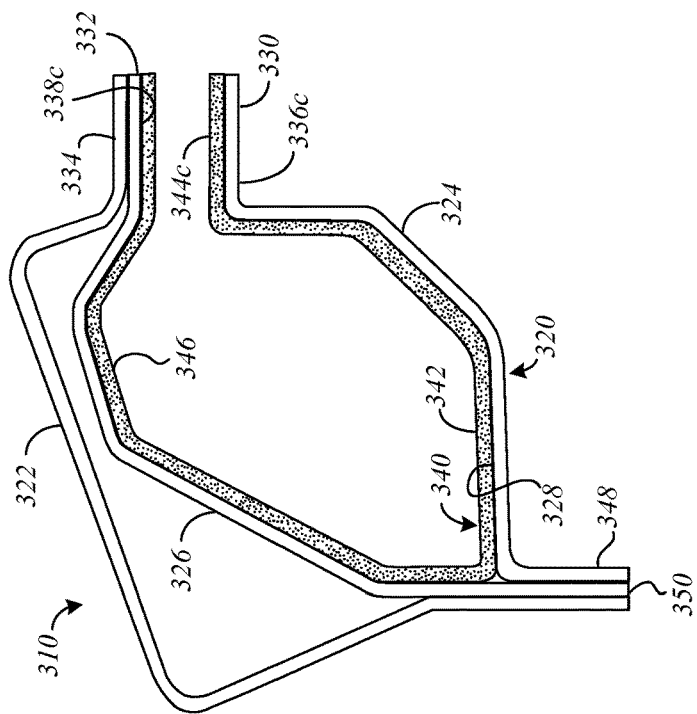
FIG. 3B is a sectional view through FIG. 3A.
Figure 3A:
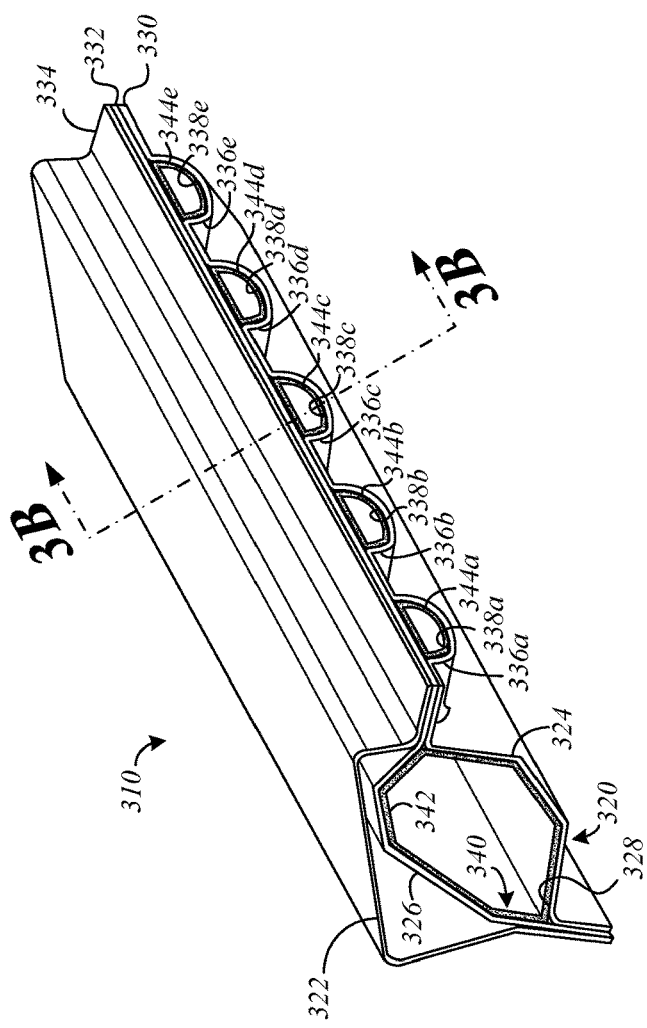
FIG. 3A is a partial perspective illustration showing another right-side roof rail of the vehicle body of FIG. 1.

FIG. 3A is a partial perspective illustration showing another portion of a right-side roof rail 310 of the vehicle body 100 of FIG. 1. FIG. 3B is a sectional view through FIG. 3A. The right-side roof rail 310 includes a rail body 320 formed of an exterior panel 322, a lower panel 324, and an upper panel 326. Though the right-side roof rails 210, 310 of FIGS. 2A, 2B, 3A, and 3B are described as having panels and flanges, separate pieces are not required. For example, the lower panel 324 and the upper panel 326 can be formed as a single, continuous panel or wall that forms the rail body 320.

In the example of FIGS. 3A and 3B, the exterior panel 322 has a generally c-shaped cross-sectional shape that surrounds and substantially encloses the upper panel 326 of the rail body 320, forming an A-class surface for the vehicle. The lower panel 324 and the upper panel 326 form an impact-absorbing vehicle body structure. An interior space 328 is defined between the lower panel 324 and the upper panel 326, making the rail body 320 a hollow, elongate beam having a consistent cross-section along its length from a first end to a second end opposite the first end.

The lower panel 324 extends to a first flanged portion 330 and the upper panel 326 extends to a second flanged portion 332, the first and second flanged portions 330, 332 serving as mating surfaces for the lower panel 324 and the upper panel 326. Coupling can be accomplished using welds, rivets, nails, bolts, friction joints, adhesive, or any other suitable joining mechanism. In the example of FIGS. 3A and 3B, the exterior panel 322 also extends to a third flanged portion 334, with the third flanged portion 334 of the exterior panel 322 being coupled to the second flanged portion 332 of the upper panel 326 to complete the rail body 320. The exterior panel 322, the lower panel 324, and the upper panel 326 can be fabricated from sheet metal, such as steel, aluminum, or composite, or can be fabricated from fiber-reinforced plastic which serves as a good thermal isolator.

The first flanged portion 330 of the lower panel 324 includes indentations 336a-e, that is, depressions or corrugations, having a semi-circular cross-sectional shape. When the first flanged portion 330 is coupled to the second flanged portion 332, the indentations 336a-e form passageways 338a-e in communication with the interior space 328 between the lower panel 324 and the upper panel 326. The passageway 338c present within the indentation 336c is shown in FIG. 3B as extending between the first flanged portion 330 and the second flanged portion 332.

The indentations 336a-e can have round, triangular, square, trapezoidal, or other shaped cross sections. Additional indentations (not shown) can also be formed in the second flanged portion 332 of the upper panel 326, that is, both of the first and second flanged portions 330, 332 can include aligned, opposing indentations (not shown) to form the various passageways 338a-e. In another example, the passageways 338a-e can communicate with the interior space 328 through use of one-piece panels or walls (not shown) that each define one of the passageways 338a-e. In other words, tubular panels or walls (not shown) can extend from the rail body 320 to define the passageways 338a-e that are in fluid communication with the interior space 328. In another example, the rail body 320 can have a singular construction that defines both the interior space 328 and the passageways 338a-e.

The passageways 338a-e are in fluid communication with the interior space 328. A coating 346, as represented in FIGS. 3A and 3B with a stippled cross-hatch, can be sprayed, dripped, or otherwise deposited within the interior space 328 and the passageways 338a-e. The coating 346 can be an expanding foam material or any other material transformable by a variety of chemical or thermal processes such that the interior space 328 and the passageways 338a-e can be sealed together within the rail body 320 to form a duct 340 within the rail body 320.

The use of foam for the coating 346 can limit thermal losses within a ventilation system, that is, foam can provide both insulation and sealing of the interior space 328 and the passageways 338a-e. The coating 346 can also be applied through access provided by the indentations 336a-e. The coating 346 can be applied before heat treatment of the rail body 320 and can be generally designed not interfere with mating processes for the various panels. For example, welds can dissipate the foam-based coating 346 during coupling without impacting overall formation of the duct 340 using the coating 346.

The duct 340 of FIGS. 3A and 3B also includes two portions: a body 342 disposed in the interior space 328 and outlets 344a-e that extend outward from the body 342 and are disposed in the passageways 338a-e. In this example, the entirety of the duct 340 is formed when the coating 346 undergoes chemical or thermal processing.

Each of the outlets 344a-e can communicate directly or indirectly with the passenger compartment. The outlets 344a-e can be covered with fabric, direct air into a plenum, or pass conditioned air directly into the passenger compartment through an interface, for example, including vanes or directional vents. By directly forming the duct 340 within the rail body 320 using a coating 346, packaging space in an interior of the vehicle is preserved and conditioned air can be directed to novel locations within the passenger compartment. The left-side roof rail (not shown) of the vehicle body 100 can have a structural configuration that is similar to that of the above-described right-side roof rail 310.

As shown in FIG. 3B, the lower panel 324 can extend between the first flanged portion 330 at one end to a fourth flanged portion 348 at the other end. The upper panel 326 can also extend between the second flanged portion 332 at one end to a fifth flanged portion 350 at the other end. The fourth and fifth flanged portions 348, 350 can be coupled to fully enclose the interior space 328 between the lower panel 324 and the upper panel 326. In other words, the first and fourth flanged portions 330, 348 at the ends of the lower panel 324 are coupled to the second and fifth flanged portions 332, 350 at the ends of the upper panel 326 in order to define the interior space 328 that holds the duct 340. This type of paneled construction would allow the panels 324, 326 to be sprayed with the coating 346 prior to mating.

What is claimed is:

1. A vehicle body structure located adjacent to a passenger compartment of the vehicle, the structure comprising:
    a lower panel and an upper panel coupled to define an interior space between the lower panel and the upper panel;
    a first flanged portion extending generally perpendicularly outward from the lower panel and having indentations defining passageways in communication with the interior space; and
    a duct having a duct body that is disposed in the interior space and having outlets that extend outward from the body and are disposed in respective passageways of the first flanged portion,
    wherein the duct routes conditioned air from the duct body through the outlets to the passenger compartment of the vehicle, and wherein the vehicle body structure supports portions of the vehicle.

2. The structure of claim 1, further comprising: spacers disposed between the duct body and the lower and upper panels to fix a position of the duct body within the interior space.

3. The structure of claim 2, wherein the spacers are formed of foam that expands when exposed to heat to fix the position of the duct body within the interior space.

4. The structure of claim 1, wherein the lower and upper panels and the first flanged portion are formed of at least one of steel, aluminum, magnesium, titanium, plastic, or composite material.

5. The structure of claim 1, wherein the duct body is formed of at least one of foam, plastic, or non-metallic material.

6. The structure of claim 1, wherein the passageways have at least one of round, triangular, square, parabolic, ellipsoid, free-form, or trapezoidal cross sections.

7. A vehicle body structure located adjacent to a passenger compartment of the vehicle, the structure comprising:
a lower panel extending to a first flanged portion;
an upper panel extending to a second flanged portion,
wherein the first flanged portion and the second flanged portion are coupled to form an interior space between the lower panel and the upper panel,
wherein the first flanged portion has indentations that form passageways between the first flanged portion and the second flanged portion, the passageways in communication with the interior space; and
a duct having a body disposed in the interior space between the lower panel and the upper panel and outlets that extend generally perpendicularly outward from the body and are disposed in the passageways, the duct routing conditioned air from the body through the outlets to the passenger compartment of the vehicle,
wherein the vehicle body structure supports portions of the vehicle.

8. The structure of claim 7, wherein the first flanged portion and the second flanged portion are coupled using at least one of welds, rivets, nails, bolts, friction joints, or adhesive.

9. The structure of claim 7, wherein the indentations have at least one of a round, triangular, square, parabolic, ellipsoid, free-form, or trapezoidal cross-section.

10. The structure of claim 7, wherein the body is formed of at least one of foam, extruded plastic, or non-metallic material.

11. The structure of claim 7, wherein the lower panel extends to a fourth flanged portion and the upper panel extends to a fifth flanged portion.

12. The structure of claim 11, wherein the fourth flanged portion and the fifth flanged portion are coupled to enclose the interior space between the lower panel and the upper panel.

13. The structure of claim 7, further comprising:
spacers disposed in the interior space between the body and the lower panel and the body and the upper panel to fix a position of the body within the interior space.

14. The structure of claim 13, wherein the spacers are formed of foam that expands when exposed to heat to fix the position of the body within the interior space.

15. A vehicle body structure located adjacent to a passenger compartment of the vehicle, the structure comprising:
a rail body, comprising:
a lower panel extending to a first flanged portion; and
an upper panel extending to a second flanged portion,
wherein the first flanged portion and the second flanged portion are coupled to form an interior space between the lower panel and the upper panel, and
wherein the first flanged portion has indentations that form passageways between the first flanged portion and the second flanged portion, the passageways in communication with the interior space; and
a duct, comprising:
a duct body extending along the interior space; and
outlets that extend from the duct body through respective passageways,
wherein the duct body and the outlets are formed by heat treatment of a coating deposited on surfaces of the lower and upper panels and the first and second flanged portions that form the interior space and the passageways, and
wherein the duct routes conditioned air from the duct body through the outlets to the passenger compartment of the vehicle.

16. The structure of claim 15, wherein the lower panel and the upper panel are formed of at least one of steel, aluminum, magnesium, titanium, plastic, or composite material.

17. The structure of claim 15, wherein the passageways have at least one of round, triangular, square, parabolic, ellipsoid, free-form, or trapezoidal cross sections.

18. The structure of claim 15, wherein the first flanged portion and the second flanged portion are coupled using at least one of welds, rivets, nails, bolts, friction joints, or adhesive.

19. The structure of claim 18, wherein the first flanged portion and the second flanged portion are coupled using the welds, and wherein the welds dissipate the coating on the surfaces of the first flanged portion and the second flanged portion during coupling of the first flanged portion and the second flanged portion.

20. The structure of claim 15, wherein the coating is sprayed on the surfaces of the lower and upper panels and the first and second flanged portions prior to coupling of the first flanged portion and the second flanged portion to form the interior space.

* * * * *